(12) United States Patent
Dietrich et al.

(10) Patent No.: US 7,313,448 B2
(45) Date of Patent: Dec. 25, 2007

(54) METHOD AND APPARATUS FOR PROVIDING A STANDARD CONTROL SYSTEM WITH CUSTOM APPLICATION CAPABILITY

(75) Inventors: Kenneth W. Dietrich, Glendale, AZ (US); Gary L. Fox, Phoenix, AZ (US); Jethro F. Steinman, Havertown, PA (US); Jennifer L. O'Connell, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 11/204,644

(22) Filed: Aug. 15, 2005

(65) Prior Publication Data

US 2007/0038730 A1 Feb. 15, 2007

(51) Int. Cl.
G05B 11/01 (2006.01)
G05B 15/00 (2006.01)
G06F 9/44 (2006.01)

(52) U.S. Cl. .................... 700/17; 700/18; 700/83; 717/100; 717/110; 717/120

(58) Field of Classification Search ............ 700/17–18, 700/83; 717/100, 110, 120
See application file for complete search history.

(56) References Cited

U.S. PATENT DOCUMENTS

| 5,909,368 | A | * | 6/1999 | Nixon et al. ............... 700/2 |
| 6,078,320 | A | * | 6/2000 | Dove et al. ............... 715/866 |
| 6,560,770 | B1 | * | 5/2003 | Saxena et al. ............. 717/107 |
| 2004/0194101 | A1 | * | 9/2004 | Glanzer et al. ............ 718/100 |
| 2005/0055111 | A1 | * | 3/2005 | Law et al. ................. 700/83 |
| 2005/0222698 | A1 | * | 10/2005 | Eryurek et al. ............. 700/90 |

* cited by examiner

*Primary Examiner*—Ronald Hartman, Jr.
(74) *Attorney, Agent, or Firm*—Ohlandt, Greeley, Ruggiero & Perle, LLP

(57) ABSTRACT

A system and method for managing the activities of a process. The system includes a first computer that uses standard control classes to manage the activities according to a standard control strategy. A second computer is used by a user to input custom data. A custom application program uses the custom data to automatically develop a customized control strategy as a custom class that operates as an inherited class of a base class of the standard classes to augment the standard control strategy with the customized control strategy in the management of the activities.

12 Claims, 3 Drawing Sheets

METHOD AND APPARATUS FOR PROVIDING A STANDARD CONTROL SYSTEM WITH CUSTOM APPLICATION CAPABILITY

FIELD OF THE INVENTION

This invention relates to a method and apparatus for allowing the development, use and maintenance of custom applications in process control systems.

BACKGROUND OF THE INVENTION

User engineers are primarily concerned with writing custom applications and not necessarily with the internal details that are required to access (to read or write) data in a process control system. User engineers need to be able to easily and efficiently create, use and maintain custom control applications that enhance the control experience and that look and behave like the standard control applications supplied with a control system. Users desire to be able to create specialized or custom applications that embody their proprietary control knowledge and experience and look and feel as an integral part of the entire control system. Control system vendors do not always possess a detailed knowledge of the user process and, therefore, are unable to create and sell specialized or custom applications to augment the standard control application offering.

Thus, there is need for a method and apparatus that permits a user to develop, use and maintain custom applications to a standard control system.

SUMMARY OF THE INVENTION

A system of the present invention manages activities of a process with at least a first computer that uses a plurality of standard control classes to manage the activities according to a standard control strategy. A second computer comprises a processor and a custom application program that comprises a configuration tool and that responds to custom data input by a user via the tool to automatically develop a customized control strategy as a custom class. The custom class is operable as an extension of at least one of the standard control classes to augment the standard control strategy with the customized control strategy in the management of the activities.

In another embodiment of the system of the present invention, the custom data comprises user defined parameters of the process. The custom application program further comprises a user variable class generator that generates one or more user variable classes of the user defined parameters.

In another embodiment of the system of the present invention, one of the user variable classes is generated for each user defined parameter.

In another embodiment of the system of the present invention, the custom application program further comprises a parameter definition editor that edits the user defined parameters into a form that is usable by the user variable class generator.

In another embodiment of the system of the present invention, the custom data comprises a user defined program logic that is incorporated into the custom class.

In another embodiment of the system of the present invention, the custom class and the user variable classes inherit logic and data functions from the standard control class.

A method of the present invention manages the activities of a process by using a first computer that uses a plurality of standard control classes to manage the activities according to a standard control strategy. The first computer responds to custom data input by a user via a graphical user interface to automatically develop a customized control strategy as a custom class. The custom class is operable as an extension of at least one of the standard control classes to augment the standard control strategy with the customized control strategy in the management of the activities.

In another embodiment of the method of the present invention, the custom data comprises user defined parameters of the process and the method further comprises generating one or more user variable classes of the user defined parameters.

In another embodiment of the method of the present invention, one of the user variable classes is generated for each user defined parameter.

In another embodiment of the method of the present invention, the method further comprises editing the user defined parameters into a form that is usable by the user variable class generator.

In another embodiment of the method of the present invention, the custom data comprises a user defined program logic that is incorporated into the custom class.

In another embodiment of the method of the present invention, the custom class and the user variable classes inherit logic and data functions from the standard control class.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
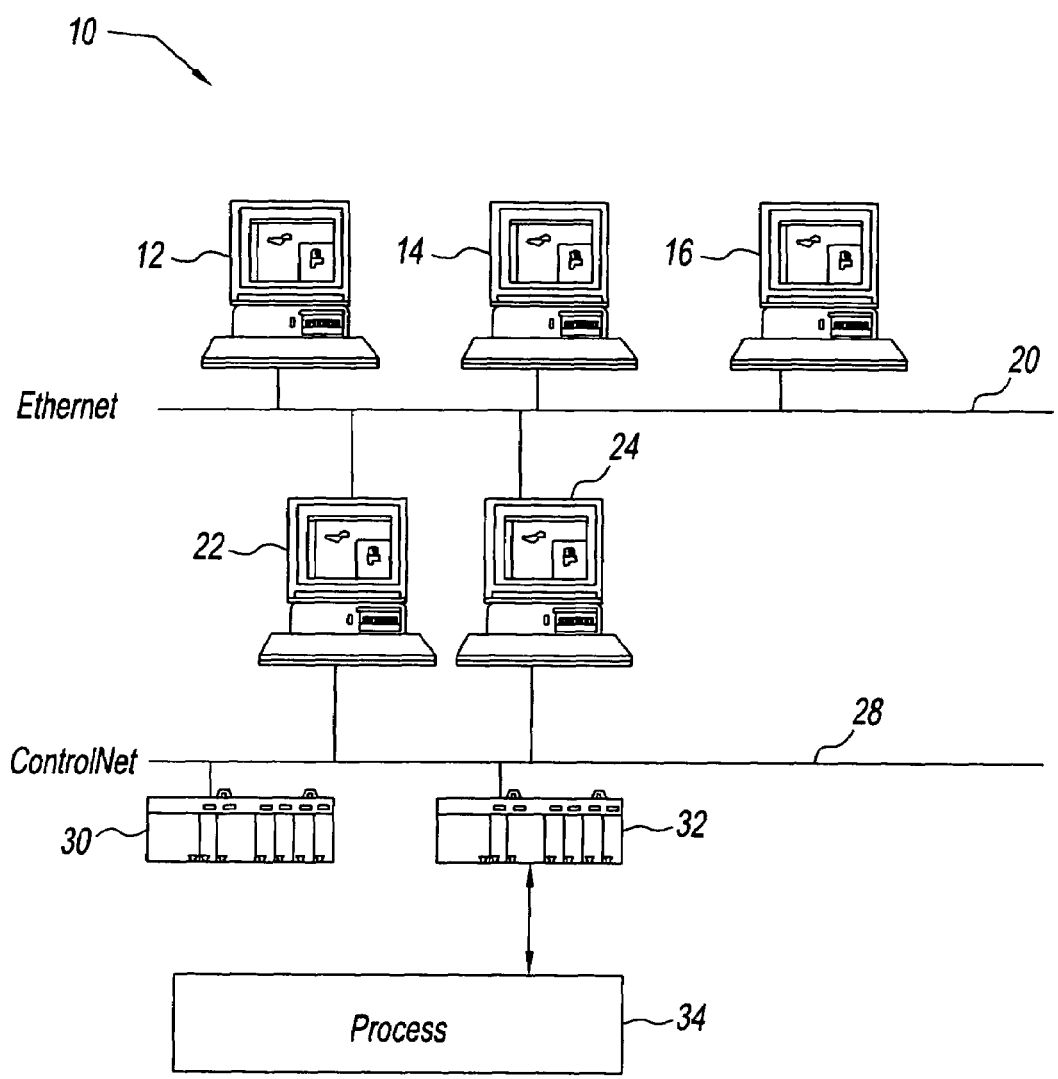
FIG. 1 is a block diagram of a control system for the management and control of a process.

Referring to FIG. 1, a process control system 10 is arranged to control a process 34. Process 34 can be any process that requires monitoring and/or control. For example, process 34 may require the filling and/or emptying of one or more tanks with material, such as liquid or gas.

Process control system 10 comprises an ACE (Application Control Environment) server 12, a PHD (Plant History Database) server 14 and a workstation 16 interconnected by a bus 20. A PKS server 22 and an additional ACE server 24 are also connected to bus 20. Bus 20 is a communication bus that can use any suitable protocol, such as Ethernet, FTE (Fault Tolerant Ethernet) or other protocol.

PKS server 22 and ACE server 24 are also interconnected via a bus 28 with a hybrid controller 30 and a remote I/O controller 32. Bus 28 may be any suitable bus, such as a FTE or ControlNet (both are fault tolerant, dual cable, proprietary architecture). Hybrid controller 30 is interconnected with devices that monitor and/or control process 34. Remote I/O controller 32 is also interconnected with devices associated with process 34.

ACE server 12 is operable to manage the activities of process 34. ACE server 24 is also capable of managing the activities of process 34 and may operate in cooperation with ACE server 12. In other embodiments, either ACE server 12 or ACE server 24 may be omitted. PHD 14 provides access to a database containing historical data of process 34. PKS 22 comprises a database that stores information related to control strategies for process 34. Workstation 16 comprises the custom application program capability for a user to develop, use and maintain custom programs in control system 10. These custom application programs are operable within ACE 12 and ACE 24. In other embodiments, the custom application programs could also, or alternatively, run on controller 30.

For example, control system 10 may be configured as an Experion™ system available from Honeywell Inc. Control system 10 comprises a control structure that uses in a preferred embodiment a plurality of control blocks that function to process control data according to a control strategy for the particulars of process 34. Control system 10 also includes hardware and software to access memory in which control data is written and read. The control data memory may be a database, distributed memory throughout control system 10 or a combination thereof.

Figure 2:
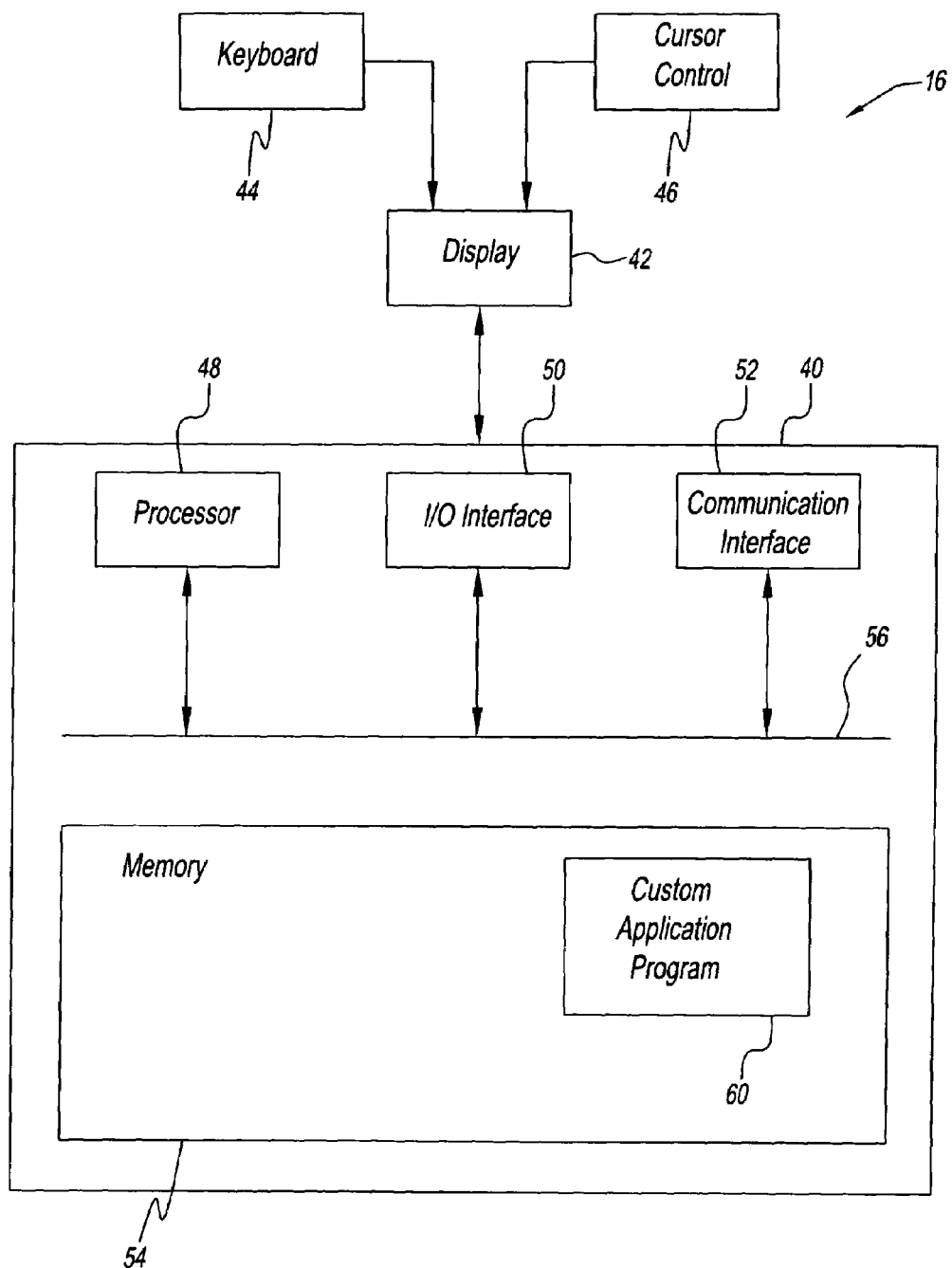
FIG. 2 is a block diagram of the user work station of the FIG. 1 system with the custom application embodiment of the present invention.

Referring to FIG. 2, workstation 16 comprises a computer 40 and a display device 42. Display device 42 is interconnected with user input devices shown as a keyboard 44 and a cursor control 46. Display device 42 may be any suitable display device that displays images, such as a cathode ray tube, flat panel display and the like. Cursor control 46, for example, may be a mouse.

Computer 40 comprises a processor 48, an I/O interface 50, a communication interface 52 and a memory 54, which are interconnected via a bus 56. Computer 40 also includes a custom application program 60, which is disposed in memory 54. Memory 54 may comprise a random access memory (RAM), a read only memory (ROM), a flash memory, a disk memory and/or other memory type. I/O interface 50 provides an interface between computer 42 and display device 42 as well as other I/O devices that may be interconnected with computer 40. Communication interface 52 provides a communications interface between computer 40 and bus 20 (FIG. 1). For example, if Ethernet is used as the communication mode of choice, communication interface 52 and bus 20 are configured for Ethernet. In other embodiments, communication interface 52 and bus 20 are configured for other communication protocols.

Custom application program 60 affords the user the capability of designing or creating control strategies that are customized to the user's process 34. Using workstation 16, a user can create custom control blocks for incorporation into control system 10 in a way that makes them look and behave like pre-defined control blocks designed into control system 10 by the vendor. This facilitates seamless control strategies that use custom control along with standard control. The custom blocks have access to process control data and can supply data to other process blocks. The custom blocks can also determine their own state information.

The definitions set forth below are used in the description of the present invention.

CEE (Control Execution Environment) is a process control environment used by ACE servers 12 and 24.
CAB is a generic term for the custom program created by the user.
CAB class generator is a tool/application that generates a user variable class definition (e.g., BlockBase).
SysBase—is a base class of CEE.
Parameter Definition Editor—is a configuration tool used by the user to input a list of user variables for use to access control variables for the CAB program.
UDP—is a User Defined Parameter. When entered by the user, a list of UDPs is formed with each item in the list being viewed as a parameter.
CABlock—is a class name for the custom program, which is also a class that is derived from a BlockBase class.
BlockBase—is a class that is generated by derivation from the SysBase class.

Custom application program 60 comprises a Build Time environment and a Run Time environment. The Build Time environment allows the user to create and maintain the custom program or CABlock. The Run Time environment allows CABlock to participate in the execution of process control strategies.

Figure 3:
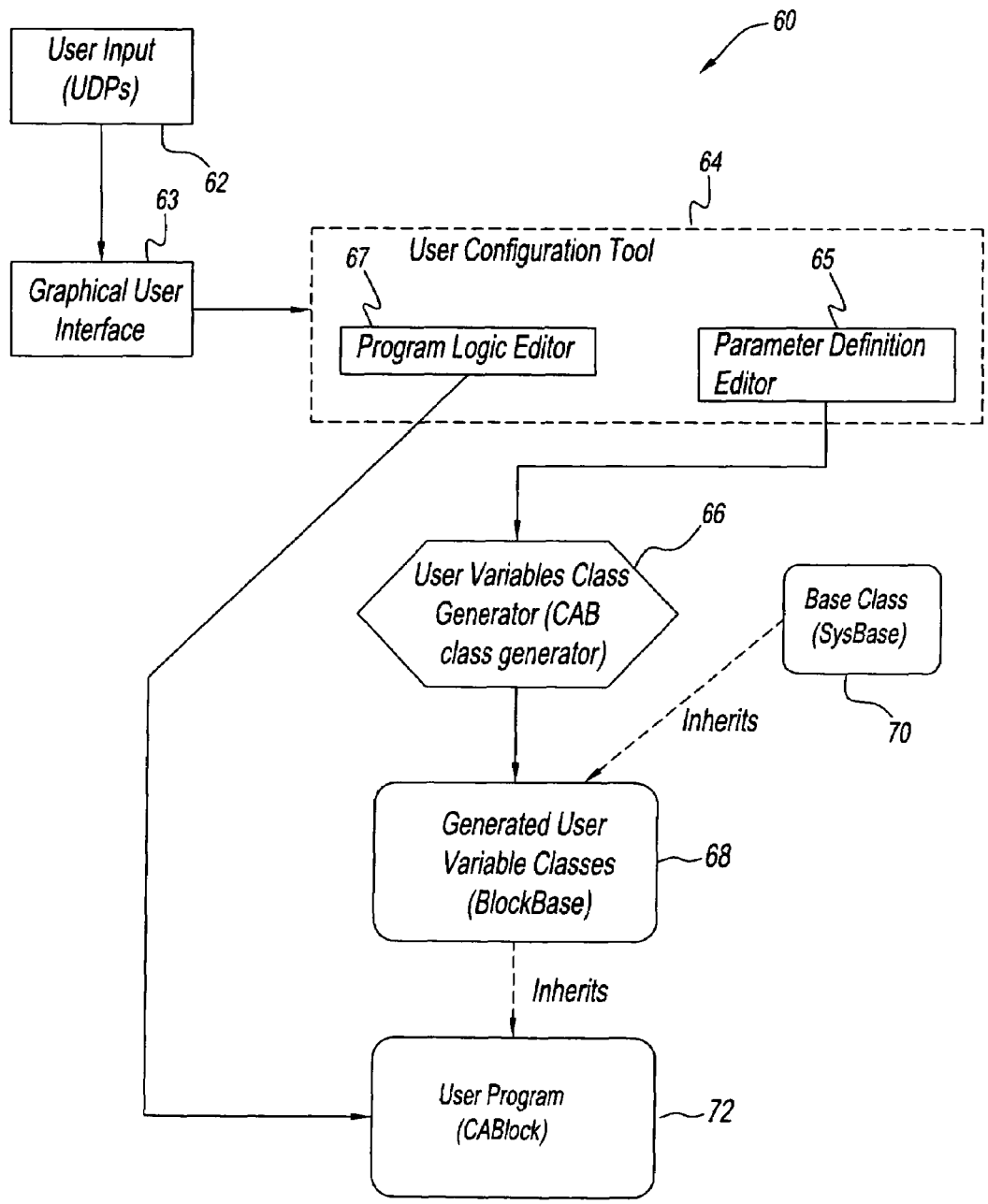
FIG. 3 is a flow diagram of the custom application embodiment of the present invention.

Referring to FIG. 3, custom application program 60 when run by processor 48 for the build time environment presents a graphical user interface 63 on display 42. Graphical user interface 63 comprises one or more windows. One of these windows comprises a form, e.g., a spreadsheet, for the user to enter UDPs. User entry of the UDPs and associated attributes is depicted by a user input step 62 in FIG. 3. Alternatively, the UDPs could be imported from a library of user variables pertaining to process 34.

The UDPs are variables and data types relating to the variables to be used in the user's custom control strategy for process 34. For example, a UDP includes a variable name, a data type and whether it is a value or reference data type. These UDPs will be mapped later to external process control variables, which, e.g., are data associated with process points of control system 10. Being able to access these external control process variables is being able to access the process points to get access to the data stored within process points. The behavior of control system 10 is controlled by reading and writing the process point data.

Custom application program 60 also includes a configuration tool 64 and a CAB class generator 66. Configuration tool 64 includes a parameter definition editor 65 that edits the UDPs into a form that can be used by CAB class generator 66. CAB class generator 66 performs object oriented class generation for the UDPs. A base class 70 of the standard control application of control system 10 contains a logic that is necessary to access the external data in the control system 10 and/or to map the UDPs to the actual process control variable. For example, base class 70 may suitably be a SysBase class of an ACE system. CAB class generator 66 forms for each edited UDP an object oriented class that inherits base class 70. Collectively, the generated classes are referred to as BlockBase as depicted at box 68. That is, BlockBase 68 contains class definitions for each of the UDPs that were input by the user. BlockBase 68 inherits from base class 70 the ability to access the external data in control system 10.

The user at step 62 can also enter user generated custom program logic for process 34 via graphical user interface 63. For example, the window used for entry of UDPs may contain a program logic entry template or may provide a selector that the user can use to have the template presented. For example, the template my be a drop down or popup or even a separate window. In one embodiment, Visual Studio is used in which one window is open within it for the user to enter and modify the program logic and another window for the user to enter and modify the UDPs.

Configuration tool 64 further includes a program logic editor 67 that edits the entered program logic for compatibility with BlockBase 68 and base class 70. The entered program logic together with BaseBlock forms the user's custom program CABlock as depicted by box 72.

CABlock 72 is the actual user program that is derived from the user's UDPs and/or program logic. CABlock 72 is also defined as a class, which inherits from the generated user variable classes of BlockBase 68. This inheritance is what allows the user to use the UDPs inside CABlock 72 just as the user would use any other local variable that the user could define in the user's program. UDPs are classes that have properties and methods that either allow the value of the UDP to be seen and modified by the rest of the control system or allow CABlock 72 to read or modify other control system data. That is, a UDP is another storage class or data type in which the logic behind the UDP variables is defined in the many classes of the standard control application. For instance, there may be two kinds of UDPs that use a different class hierarchy—ones that define data and ones that reference other data. Both UDP kinds contain logic that allows them to interact with the control system 10. For the UDPs that define data, there is a base class that controls interaction with the control system and there is one derived class for each data type supported. For example, there is one derived class for floating real data (real numbers 0.0, 0.1, 1.1, etc.), one for integer data (the integer numbers 0, 1, 2, etc.), one for textual data, etc. For the UDPs that reference other data, there is a base class that controls interaction with the control system and there is one derived class for each data type supported. For example, there is one derived class for floating real data (real numbers 0.0, 0.1, 1.1, etc.), one for integer data (the integer numbers 0, 1, 2, etc.), one for textual data, etc. There is a class hierarchy for the code that is separate from the UDPs. The base class 70 in FIG. 3 is the top level class for the code. It contains all of the logic to allow CABlock 72 to interact with control system 10 seamlessly as though it were a predefined part thereof. BlockBase class 68 is derived from base class 70 and extends base class 70 to add the UDPs that the user has defined. CABlock 72 is derived from BlockBase class 68 and extends BlockBase 68 to add the user entered program logic that embodies the user's control logic.

Based on classes inherited from base class 70, BlockBase contains a class instance for each defined UDP. These inherited class instances make it simple for the user written algorithm to access the UDP values as they become variables in the algorithm.

Base class 70 includes common class definitions for reference data types and data enumerations of control system 10. These classes contain a member variable to represent the actual data and member variables to return the status of the data access back to the user. Base class 70 also contains the necessary code (methods on the class) for loading the user code that is inherited (derived) from base class 70 into the process control environment.

The user adds program logic into CABlock 72, which is defined as a class that will inherit from BlockBase 68. BlockBase 68 makes the UDPs known in the user program CABlock 72. The CABlock class also provides the logic necessary at runtime to access the process control variables. CABlock 72 is generated automatically based on user entries of UDPS and logic entered via the parameter definition editor of configuration tool 64 when the user selects to save the entered UDPs and logic.

CABlock 72 is a class definition that inherits (derives) from BlockBase 68. This inheritance is what gives the functionality to the user to be able to use their variables in CABlock 72 just as if they were local variables. It is also what gives the ability at runtime for these variables to access process control variables within control system 10. CABlock 72 contains the main methods that are called to run the user program within the process control environment.

An exemplary embodiment of the present invention uses a combination of C#.Net and VB.Net for custom application program 60. An example of what type of data that would be exposed to the user to configure UDPs comprises three user variables: STR, I32 and FLOW. STR, I32 and FLOW are Value UDPs. This data would be entered into the configuration form of configuration tool 64 as illustrated by Table 1.

TABLE 1

| Name | Data Type | Access Type |
|------|-----------|-------------|
| FLOW | Float64   | Value CDP   |
| I32  | Int32     | Value CDP   |
| STR  | String    | Value CDP   |

CAB class generator 66 generates a class definition as follows:

```
public class BlockBase Inherits base class 70 {
    public Float64UDP FLOW
    public Int32UDP I32
    public StringUDP STR
    public override Subroutine InitializeParams( )
        ICABSystemValueParameter vpVal;
        vpVal = AddValueParameter("FLOW", FLOAT64)
        vpVal.AccessLock = Operator
        // Additonal attributes on a UDP could be defined in similar
manner as above
        FLOW = new Float64UDP(vpVal)
        vpVal = AddValueParameter("I32", INT32)
        vpVal.AccessLock = Operator
        I32 = new Int32UDP(vpVal)
        vpVal = AddValueParameter("STR", STRING)
        vpVal.StringDataSize = 32
        vpVal.AccessLock = Operator
        STR = new StringUDP(vpVal)
    End Subroutine
End Class
        The following is an example of CABlock 72 for above
BlockBase example.
Public Class CABlock
        Inherits BlockBase
        Public Overrides Subroutine Execute( )
            FLOW.Value = 1.0
            I32.Value = 5
            STR.Value = "Text"
        End Subroutine
End Class
```

The present invention having been thus described with particular reference to the preferred forms thereof, it will be obvious that various changes and modifications may be made therein without departing from the spirit and scope of the present invention as defined in the appended claims.

What is claimed is:

1. A system for managing activities of a process, said system comprising:
    at least a first computer that uses a plurality of standard control classes to manage said activities according to a standard control strategy; and
    a second computer comprising a processor and a custom application program that comprises a configuration tool and that responds to custom data input by a user via said tool to automatically develop a customized control strategy as a custom class that is operable as an extension of at least one of said standard control classes to augment said standard control strategy with said customized control strategy in the management of said activities.

2. The system of claim 1, wherein said custom data comprises user defined parameters of said process, and wherein said custom application program further comprises a user variable class generator that generates one or more user variable classes of said user defined parameters.

3. The system of claim 2, wherein one of said user variable classes is generated for each user defined parameter.

4. The system of claim 2, wherein said custom application program further comprises a parameter definition editor that edits the user defined parameters into a form that is usable by said user variable class generator.

5. The system of claim 2, wherein said custom data comprises a user defined program logic that is incorporated into said custom class.

6. The system of claim 5, wherein said custom class and said user variable classes inherit logic and data functions from said standard control class.

7. A computer implemented method for managing activities of a process, said method comprising:

using a plurality of standard control classes to manage said activities according to a standard control strategy; and responding to custom data input by a user via a graphical user interface to automatically develop a customized control strategy as a custom class that is operable as an extension of at least one of said standard control classes to augment said standard control strategy with said customized control strategy in the management of said activities.

8. The method of claim 7, wherein said custom data comprises user defined parameters of said process, and wherein said method further comprises:

generating one or more user variable classes of said user defined parameters.

9. The method of claim 8, wherein one of said user variable classes is generated for each user defined parameter.

10. The method of claim 9, further comprising editing the user defined parameters into a form that is usable by said user variable class generator.

11. The method of claim 10, wherein said custom data comprises a user defined program logic that is incorporated into said custom class.

12. The method of claim 11, wherein said custom class and said user variable classes inherit logic and data functions from said standard control class.

* * * * *